United States Patent
Wetzel et al.

(10) Patent No.: US 9,865,886 B2
(45) Date of Patent: Jan. 9, 2018

(54) COOLABLE BATTERY SYSTEM, METHOD FOR COOLING A BATTERY AND AUTOMOBILE COMPRISING A COOLABLE BATTERY SYSTEM

(75) Inventors: Guido Wetzel, Neuburg (DE); Peter Murla, Taufkirchen/Jettenstetten (DE)

(73) Assignee: Continental Automotive GmbH, Hannover (DE)

( * ) Notice: Subject to any disclaimer, the term of this patent is extended or adjusted under 35 U.S.C. 154(b) by 618 days.

(21) Appl. No.: 13/812,708

(22) PCT Filed: Jul. 25, 2011

(86) PCT No.: PCT/EP2011/062706
§ 371 (c)(1),
(2), (4) Date: Jun. 7, 2013

(87) PCT Pub. No.: WO2012/013615
PCT Pub. Date: Feb. 2, 2012

(65) Prior Publication Data
US 2013/0255918 A1    Oct. 3, 2013

(30) Foreign Application Priority Data

Jul. 28, 2010 (DE) .......... 10 2010 032 598
Mar. 14, 2011 (DE) .......... 10 2011 005 501

(51) Int. Cl.
*H01M 6/50* (2006.01)
*H01M 10/625* (2014.01)
(Continued)

(52) U.S. Cl.
CPC ....... *H01M 6/5038* (2013.01); *H01M 10/613* (2015.04); *H01M 10/625* (2015.04);
(Continued)

(58) Field of Classification Search
CPC ............ H01M 10/613; H01M 10/625; H01M 10/6568; H01M 10/663; H01M 2/1077; H01M 6/5038; H01M 10/5004
(Continued)

(56) References Cited

U.S. PATENT DOCUMENTS 2,984,774 A * 5/1961 Race ................ H01L 23/4006
165/185
4,468,440 A * 8/1984 Evjen ............................ 429/8
(Continued)

FOREIGN PATENT DOCUMENTS

EP    1278263 A2    1/2003
JP    2009301877 A    12/2009
(Continued)

*Primary Examiner* — Frantz Jules
*Assistant Examiner* — Raheena R Malik
(74) *Attorney, Agent, or Firm* — Laurence A. Greenberg; Werner H. Stemer; Ralph E. Locher

(57) ABSTRACT

A battery includes at least one integrated first heat exchanger element that forms an integral part of the battery and is formed in one piece with the battery. The heat exchanger element can end flush with the surface of the battery, but it can also protrude from or be recessed into the surface of the battery. A coolable battery system includes at least one such battery and a second heat exchanger element for each battery that can be reversibly brought into thermal operative contact with the first heat exchanger element. A method for cooling such a battery in the coolable battery system, in which the first heat exchanger element of the at least one battery is brought in thermal operative connection with the second heat exchanger element, includes maintaining the second heat exchanger element at a lower temperature level than the first heat exchanger element.

12 Claims, 2 Drawing Sheets

(51) Int. Cl.
*H01M 10/663* (2014.01)
*H01M 10/6556* (2014.01)
*H01M 10/6568* (2014.01)
*H01M 10/6567* (2014.01)
*H01M 10/6554* (2014.01)
*H01M 10/613* (2014.01)

(52) U.S. Cl.
CPC ... *H01M 10/6554* (2015.04); *H01M 10/6556* (2015.04); *H01M 10/6567* (2015.04); *H01M 10/6568* (2015.04); *H01M 10/663* (2015.04)

(58) Field of Classification Search
USPC .................................. 165/41; 429/120
See application file for complete search history.

(56) References Cited

U.S. PATENT DOCUMENTS

| | | | | |
|---|---|---|---|---|
| 5,756,227 | A * | 5/1998 | Suzuki et al. | 429/62 |
| 6,109,345 | A * | 8/2000 | Giacomel | A23L 1/01 165/104.21 |
| 2003/0017384 | A1 | 1/2003 | Marukawa et al. | |
| 2004/0194489 | A1* | 10/2004 | Pode | 62/259.2 |
| 2006/0063067 | A1* | 3/2006 | Kim | H01M 2/021 429/148 |
| 2006/0220615 | A1* | 10/2006 | Kim | H01M 2/202 320/116 |
| 2006/0246348 | A1* | 11/2006 | Hamada | H01M 2/1072 429/148 |
| 2009/0087727 | A1* | 4/2009 | Harada et al. | 429/120 |
| 2009/0123815 | A1* | 5/2009 | Alkemade et al. | 429/50 |
| 2009/0173559 | A1* | 7/2009 | Nakamura | B60K 1/04 180/68.5 |
| 2009/0258286 | A1* | 10/2009 | Ho | H01M 2/0245 429/100 |
| 2010/0136391 | A1* | 6/2010 | Prilutsky et al. | 429/62 |
| 2010/0136406 | A1* | 6/2010 | Song et al. | 429/120 |
| 2010/0147488 | A1* | 6/2010 | Pierre | H01M 2/1077 165/47 |
| 2010/0151307 | A1* | 6/2010 | Naganuma | H01M 2/1072 429/99 |
| 2010/0304203 | A1* | 12/2010 | Buck et al. | 429/120 |
| 2010/0304250 | A1* | 12/2010 | Chan et al. | 429/430 |
| 2010/0307723 | A1* | 12/2010 | Thomas et al. | 165/104.33 |
| 2011/0000241 | A1* | 1/2011 | Favaretto | 62/244 |
| 2011/0097617 | A1* | 4/2011 | Gu | H01M 2/1077 429/120 |
| 2011/0117410 | A1* | 5/2011 | Yoon | F28D 15/0275 429/120 |
| 2011/0287285 | A1* | 11/2011 | Yoon | H01M 10/5016 429/9 |
| 2012/0070711 | A1* | 3/2012 | Souki | H01M 10/6566 429/120 |

FOREIGN PATENT DOCUMENTS

| | | |
|---|---|---|
| WO | 2009062710 A1 | 5/2009 |
| WO | WO 2009061451 A1 * | 5/2009 |

\* cited by examiner

COOLABLE BATTERY SYSTEM, METHOD FOR COOLING A BATTERY AND AUTOMOBILE COMPRISING A COOLABLE BATTERY SYSTEM

BACKGROUND OF THE INVENTION

Field of the Invention

In order to be able to produce and utilize large-capacity batteries, in particular lithium-ion batteries, attention must be paid to dissipating the heat generated. For large capacities, as needed, for example, to operate an electric vehicle, a liquid cooling system must be provided in order to be able to dissipate the heat capacity accordingly. To be able to keep the cooling liquid always sufficiently capable of heat absorption, this liquid should be maintained at the correct temperature in a separate cooling apparatus. In concepts with exchangeable batteries, the connection to the cooling system must therefore always be exchanged as well. This has the disadvantage that the temperature-controlled connection must be isolated from the pressurized cooling circuit.

BRIEF SUMMARY OF THE INVENTION

It was therefore the object of the present invention to specify a coolable battery system in which the disconnection of the cooling circuit can be implemented in a simple manner.

With respect to the battery, this object is achieved with the features as claimed; with respect to a battery system, with the claimed features; with respect to a method for cooling a battery, with the claimed features and with respect to an automobile, with the claimed features. In these cases the respective dependent claims represent advantageous developments.

According to the invention, therefore, a battery which comprises at least one integrated first heat exchanger element for dissipating thermal energy from the battery is provided, which first heat exchanger element forms at least a portion of the surface of the battery. In this case the integrated first heat exchanger element is a permanent component of the battery and is formed integrally with the battery. In this case the heat exchanger element of the battery may end flush with the surface but may also, for example, protrude from the surface or be recessed into the surface of the battery.

In this case the heat exchanger element is preferably configured in such a way that it has greater thermal conductivity than the remaining surface of the battery, so that a specified efficient heat exchange can be implemented via the heat exchanger element of the battery.

In a preferred embodiment, the battery has a first integrated coolant circuit which enables thermal energy to be exchanged between the battery and the first heat exchanger element.

By means of this integrated coolant circuit an efficient heat exchange from the point of origin of surplus thermal energy in the battery to the heat exchanger element is possible.

In this case it is advantageous if the coolant circuit has a pump which is integrated in the battery or is in the form of a separate external component and which enables the coolant contained in the first coolant circuit to circulate.

Examples of coolants which may be contained in the coolant circuit of the battery are coolants which permit heat exchange in a temperature range from −50° C. to +150° C.

It is further preferred that the first heat exchanger element has a structured surface. Such a structured surface consists, for example, of elevations and depressions in the surface of the heat exchanger element. This ensures that the surface area of the heat exchanger element is larger than if the surface of the heat exchanger element were flat. The larger surface area makes possible a higher heat exchange rate and therefore a more efficient heat exchange. In addition a structured surface ensures better haptic matching with a further heat exchanger element with corresponding opposite structuring, so that the two correspondingly structured heat exchanger elements can engage in one another in a form-fitting manner. Such an embodiment is discussed separately below with reference to FIG. 2.

In a preferred embodiment, the first heat exchanger element consists of a material having a thermal conductivity $\lambda$ of at least 50 W/(m·K), in particular iron, steel, copper, silver, gold, brass, metallic materials or materials having a good heat transfer coefficient.

According to the invention, a coolable battery system having at least one afore-described battery is also made available. In addition, the coolable battery system according to the invention includes a second heat exchanger element for each battery, which second heat exchanger element can be reversibly brought into thermal operative connection with the first heat exchanger element.

The thermal operative connection may be established, for example, by bringing the second heat exchanger element into mechanical contact with the first heat exchanger element. An exchange of thermal energy between the two heat exchanger elements is thereby made possible.

The second heat exchanger element preferably consists of a material having a thermal conductivity $\lambda$ of at least 50 W/(m·K), in particular iron, steel, copper, silver, gold, brass, metallic materials or materials having a good heat transfer coefficient. In an especially preferred embodiment the first and second heat exchanger elements are formed from the same material.

It is further advantageous if the second heat exchanger element is in thermal operative connection with a second coolant circuit. In this case the second heat exchanger element serves to dissipate the thermal energy which is transferred from the battery via the first heat exchanger element to the second heat exchanger element.

In a further advantageous embodiment, the second coolant circuit has at least one device for dissipating thermal energy to the environment. Such devices for dissipating thermal energy to the environment may be, for example, passive devices such as, for example, cooling ribs, radiators, etc., likewise possible, however, are also active cooling devices, for example devices in which the heat energy is transported away with the aid of a fan or a pump.

In a further preferred embodiment, the battery system includes a device which contains the second heat exchanger element as an integral component. This device also includes a connection possibility for the electrical supply of the pump of the battery; in this case the connection possibility for the electrical supply is preferably configured as a detachable electrical connection, for example a plug-in connection. According to this embodiment, therefore, the battery can both be brought into thermal connection with the second heat exchanger element and at the same time can be connected to the device which includes the second heat exchanger element, so that electrical operation of the battery pump is ensured.

According to the invention, a method for cooling a battery according to the invention in a coolable battery system according to the invention is also described, in which method the first heat exchanger element of the at least one battery is brought into thermal operative connection with the second heat exchanger element, the second heat exchanger element being maintained at a lower temperature level than the temperature level of the first heat exchanger element.

In this case the method according to the invention is based on the principle of the flow of heat from the hotter to the cooler element. Because the second heat exchanger element of the coolable battery system is maintained at a lower temperature level, heat can be efficiently removed from the battery and supplied to the cooling circuit of the coolable battery system.

In this case it is further preferred if the energy transferred from the first heat exchanger element to the second heat exchanger element is supplied via the second cooling circuit to the at least one device for dissipating thermal energy to the environment and is dissipated to the environment.

According to the invention an automobile which has a coolable battery system as described hereinbefore is also specified.

In this case it is especially preferred if the second cooling circuit of the coolable battery system is the vehicle coolant circuit of the automobile. A separate coolant circuit for the battery is thereby rendered superfluous, so that an extremely efficient and simple design is possible.

The present invention is explained in more detail with reference to the appended figures and to the following embodiments, without restricting the invention to the parameters and configurations represented. In the figures:

DESCRIPTION OF THE INVENTION

Figure 1B:
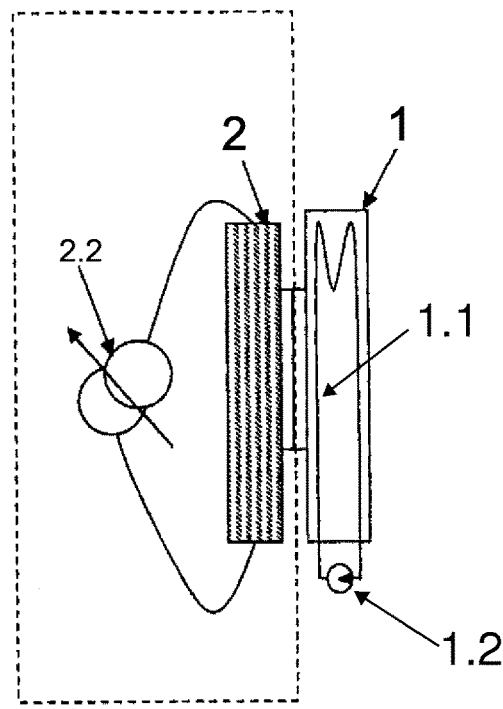
FIG. 1 shows a first embodiment of a coolable battery system according to the invention.
Figure 1A:
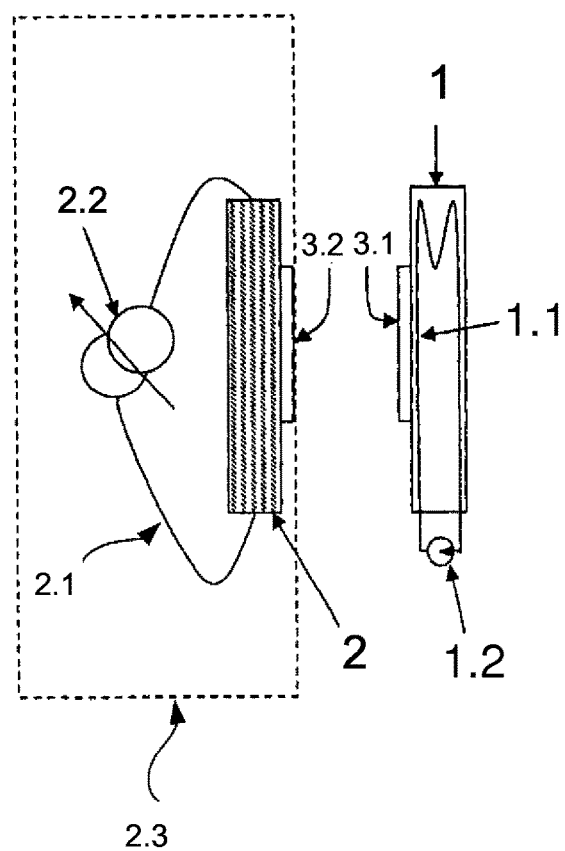

FIG. 1A shows the essential components of the coolable battery system according to the invention. A battery 1 having an integrated coolant circuit 1.1 is represented. This coolant circuit 1.1 contains a preferably liquid coolant which can be circulated via a pump 1.2. In this case a part of the coolant circuit 1.1 is in thermal operative connection with the first heat exchanger element 3.1 which is associated with the battery 1. The heat exchanger element 3.1 forms in this case part of the surface of the battery 1 and in this case is in the form of a raised element.

A cooling device which has a second heat exchanger element 3.2 forms the counterpart of the battery 1. In the embodiment represented in FIG. 1A the second heat exchanger element 3.2 has exactly the same dimensions as the first heat exchanger element 3.1. In this case the first heat exchanger element 3.1 and the second heat exchanger element 3.2 form a two-part heat exchanger. The second heat exchanger element 3.2 has in this case a second coolant circuit 2.1 with which it is in thermal interchange relation. This second coolant circuit 2.1 may also include a device for dissipating thermal energy 2.2, which in the present case may be, for example, the coolant circuit of an automobile.

In addition, the second heat exchanger element 3.2 may, for example, be mounted on or integrated in a mechanical support 2 for the battery. In this case the coolable battery system may additionally comprise a device 2.3, for example a housing, in which the second heat exchanger element 3.2 together with its associated components is integrated.

FIG. 1B shows an embodiment in which the battery 1 is brought into connection, via its heat exchanger element 3.1, with the second heat exchanger element 3.2. For the sake of clarity, a number of reference numerals shown in FIG. 1A have been omitted.

Figure 2:
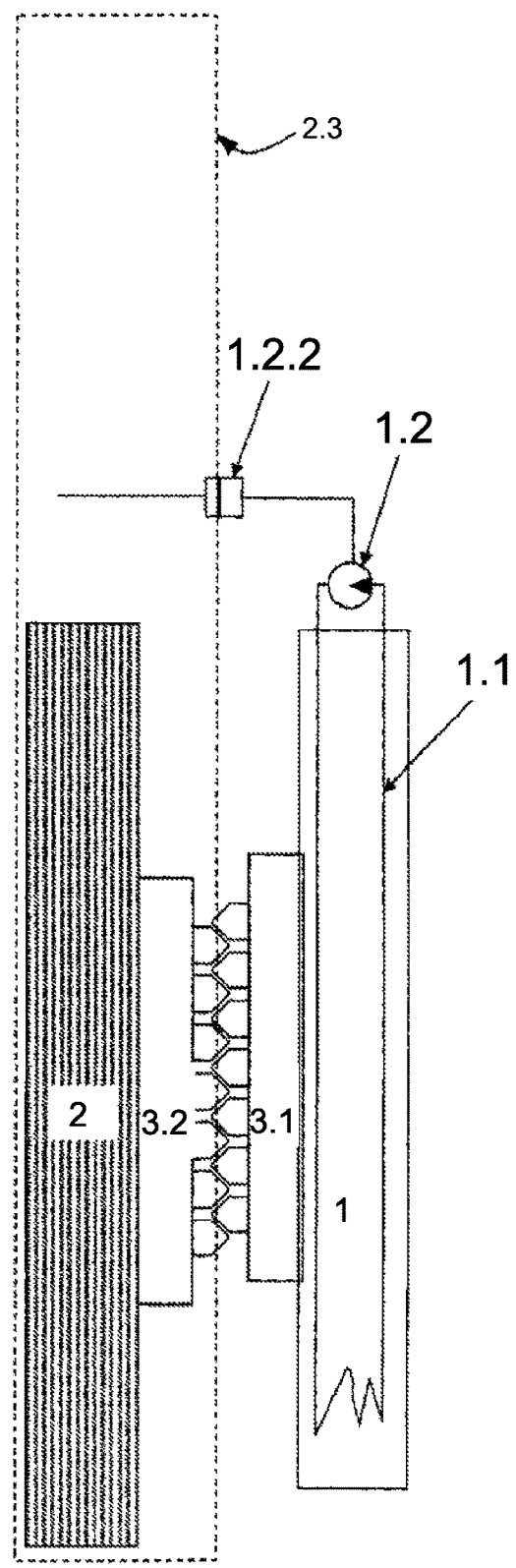
FIG. 2 shows a further embodiment of the coolable battery system according to the invention.

The embodiment according to FIG. 2 resembles in principle the embodiment in FIG. 1. In this case the two heat exchanger elements 3.1 and 3.2 have pyramid-shaped elements on their surfaces in order to achieve a surface area as large as possible of the heat exchanger elements and therefore an exchange of thermal energy as efficient as possible.

A disconnectable electrical connection 1.2.2 with which current can be supplied to the pump 1.2 is additionally shown. The disconnectable electrical connection 1.2.2 may be integrated in the housing 2.3 in which the second heat exchanger element 3.2 is also located. The disconnectable electrical connection 1.2.2 may be supplied with electrical energy, for example, via the on-board network of a vehicle.

The present invention is therefore based in principle on the following concept: A cooling system using a two-part heat exchanger 3.1, 3.2, in which the heat exchanger is configured to be separable, is proposed. One half of the heat exchanger 3.2 remains on the vehicle and is preferably cooled constantly within the cooling circuit 2.2 of the vehicle.

The other half 3.1 of the heat exchanger remains in the battery 1. If the battery is exchanged, this half 3.1 of the heat exchanger is also exchanged (cf. FIG. 1a).

The cooling system comes into being when the two halves 3.1, 3.2 of the heat exchanger are brought together, as shown in sketch form in FIG. 1b. The battery preferably has an internal circulation system of its own with a coolant circuit 1.1 and a circulation pump 1.2, the pump 1.2 being connected to the on-board network in the vehicle via a disconnectable electrical connection 1.2.2 (cf. details also in FIG. 2). On the vehicle side, the part of the heat exchanger 3.2 located on the vehicle may be, for example, mounted on or integrated in the mechanical support 2 for the battery.

For the construction of the present invention, all known heat exchangers (for example cross-flow heat exchangers or linear heat exchangers) may be used, and the two parts of the heat exchanger are, of course, optimized for a best possible, large-area thermal coupling.

A method for cooling a battery in which a cooling circuit of the vehicle is brought into thermal operative connection with a battery is therefore presented. So that the battery can be easily disconnected, it is proposed to implement the thermal operative connection via a heat exchanger which in turn is configured in two parts that can be separated.

For this purpose a battery suitable for implementing such a method comprises a first part 3.1 of a heat exchanger which can be brought into thermal operative connection with a second part of the heat exchanger 3.2 on the vehicle, but which is designed to remain on the battery when the battery is disconnected. The battery and the heat exchanger part 3.1 located thereon are in turn preferably provided with a system for circulating cooling liquid inside the battery.

Also described is a vehicle, in particular an electric or hybrid vehicle, in which a battery is thermally coupled and cooled by means of a two-part, separable heat exchanger, wherein the heat exchanger is divided and a part of the heat exchanger remains on the battery when the battery is removed. As a result, a direct coolant line into the battery can be dispensed with and a coolant circuit 1.1 which may be present in the battery is also indirectly cooled by means of this heat exchanger 3.1, 3.2 and can therefore be isolated from the coolant in the vehicle coolant circuit 2.2.

The invention claimed is:

1. A battery, comprising:
   at least one first integrated heat exchanger element configured for dissipating thermal energy from the battery;
   said first heat exchanger element being disposed on the battery and having a first surface forming at least a portion of a surface of the battery;
   said first heat exchanger element having a second surface with elevations and depressions distal from and opposite from said first surface forming the surface of the battery;
   a first integrated coolant circuit configured to enable thermal energy to be exchanged between the battery and said first heat exchanger element;
   a second heat exchanger element for each of said at least one first heat exchanger element;
   said second heat exchanger element having a structured surface with elevations and depressions which are complementary to said elevations and depressions of said first heat exchanger element;
   said elevations and depressions of said second heat exchanger element being disposed to be reversibly brought into thermal operative contact with said elevations and depressions of said first heat exchanger element;
   a second coolant circuit; and
   said second heat exchanger element being in operative thermal contact with said second coolant circuit.

2. The battery according to claim 1, wherein said first coolant circuit comprises a pump integrated in the battery or disposed as a separate external component for causing a coolant contained in said coolant circuit to circulate.

3. The battery according to claim 1, wherein said first heat exchanger element consists of a material having a thermal conductivity $\lambda$ of at least 50 W/(m·K).

4. The battery according to claim 3, wherein said material of said first heat exchanger element is selected from the group consisting of iron, steel, copper, silver, gold, brass, and metallic materials.

5. The battery system according to claim 1, wherein said second heat exchanger element consists of a material having a thermal conductivity $\lambda$ of at least 50 W/(m·K).

6. The battery system according to claim 5, wherein said material of said second heat exchanger element is selected from the group consisting of iron, steel, copper, silver, gold, brass, and metallic materials.

7. The battery system according to claim 1, wherein said second coolant circuit includes at least one thermal energy dissipating device.

8. The battery system according to claim 1, wherein said second heat exchanger element is integrated in a device having a connector for supplying electrical energy to a pump of said first cooling circuit of said first heat exchanger element.

9. A method of cooling a battery, the method comprising:
   providing a coolable battery system according to claim 1;
   bringing the first heat exchanger element of the at least one battery into thermal contact with the second heat exchanger element; and
   maintaining the second heat exchanger element at a lower temperature level than a temperature level of the first heat exchanger element.

10. The method according to claim 9, which comprises providing a cooling circuit and supplying heat energy transferred from the first heat exchanger element to the second heat exchanger element via a second cooling circuit to at least one device for dissipating thermal energy to the environment and dissipating the thermal energy to the environment.

11. An automobile, comprising a coolable battery system according to claim 1.

12. The automobile according to claim 11, which comprises a device for dissipating thermal energy being the vehicle coolant circuit of the automobile.

* * * * *